(12) United States Patent
Lee et al.

(10) Patent No.: US 9,712,043 B2
(45) Date of Patent: Jul. 18, 2017

(54) APPARATUS AND METHOD FOR CONTROLLING OVERCURRENT OF GRID-CONNECTED INVERTER DUE TO ABNORMAL GRID VOLTAGE

(71) Applicant: POSCO ENERGY CO., LTD., Seoul (KR)

(72) Inventors: Jeong Heum Lee, Pohang-si (KR); Sang Ho Moon, Pohang-si (KR); Ju Young Chang, Pohang-si (KR); Jae Sig Kim, Cheongju-si (KR); Jin Su Lee, Pohang-si (KR)

(73) Assignee: POSCO ENERGY CO., LTD. (KR)

( * ) Notice: Subject to any disclaimer, the term of this patent is extended or adjusted under 35 U.S.C. 154(b) by 0 days.

(21) Appl. No.: 14/899,015

(22) PCT Filed: Jun. 20, 2014

(86) PCT No.: PCT/KR2014/005458
§ 371 (c)(1),
(2) Date: Dec. 16, 2015

(87) PCT Pub. No.: WO2014/208932
PCT Pub. Date: Dec. 31, 2014

(65) Prior Publication Data
US 2016/0126828 A1 May 5, 2016

(30) Foreign Application Priority Data

Jun. 26, 2013 (KR) .................. 10-2013-0073772

(51) Int. Cl.
*H02M 1/32* (2007.01)
*H02M 7/04* (2006.01)

(52) U.S. Cl.
CPC .............. *H02M 1/32* (2013.01); *H02M 7/04* (2013.01); *H02M 2001/325* (2013.01)

(58) Field of Classification Search
CPC ............ H02M 1/32; H02M 1/36; H02M 7/44; H02M 7/48
See application file for complete search history.

(56) References Cited

U.S. PATENT DOCUMENTS 6,642,689 B2 * 11/2003 Ishida .................. B60L 9/22
  318/807
6,700,400 B2 * 3/2004 Atarashi ............. B60L 11/1803
  318/400.01

(Continued)

FOREIGN PATENT DOCUMENTS

CN  103163363  6/2013
JP  05252751   9/1993

(Continued)

OTHER PUBLICATIONS

International Search Report, International Application No. PCT/KR2014/005458, dated Aug. 25, 2014.

(Continued)

*Primary Examiner* — Matthew Nguyen
(74) *Attorney, Agent, or Firm* — Perman & Green, LLP

(57) ABSTRACT

An apparatus for controlling overcurrent of a grid-connected inverter due to an abnormal grid voltage includes a grid voltage sensor configured to sense a grid voltage according to an output current of the grid-connected inverter, a voltage variation calculator configured to calculate a D-axis voltage and a Q-axis voltage of the grid voltage to obtain variation values of the D-axis voltage and the Q-axis voltage, and an output current controller configured to determine whether at least one of the D-axis voltage variation value and the Q-axis voltage variation value exceeds a set value of the grid voltage variation, and decrease the output current by a predetermined value when one of the D-axis voltage varia- (Continued)

tion value and the Q-axis voltage variation value exceeds the set value of the grid voltage variation.

4 Claims, 3 Drawing Sheets

(56) References Cited

U.S. PATENT DOCUMENTS

| | | | | |
|---|---|---|---|---|
| 7,521,887 B2* | 4/2009 | Tobari | ............... | H02P 21/16 318/400.01 |
| 8,159,161 B2* | 4/2012 | Tomigashi | ............ | H02P 6/183 318/400.01 |
| 2012/0200243 A1* | 8/2012 | Kono | ............... | B60L 15/025 318/376 |
| 2013/0051103 A1 | 2/2013 | Roscoe et al. | | |
| 2013/0335041 A1* | 12/2013 | Baek | ............ | H02M 7/12 322/89 |
| 2014/0265951 A1* | 9/2014 | Gebregergis | ......... | H02P 21/22 318/400.02 |

FOREIGN PATENT DOCUMENTS

| | | |
|---|---|---|
| JP | 2000333473 | 11/2000 |
| JP | 2001136664 | 5/2001 |
| JP | 2004153957 | 5/2004 |

OTHER PUBLICATIONS

European Supplementary Search Report, European Application No. 14818167, dated Apr. 12, 2017.

\* cited by examiner

APPARATUS AND METHOD FOR CONTROLLING OVERCURRENT OF GRID-CONNECTED INVERTER DUE TO ABNORMAL GRID VOLTAGE

CROSS-REFERENCE TO RELATED APPLICATIONS

This application is the National Stage of International Application No. PCT/KR2014/005458, having an International Filing Date of 20 Jun. 2014, which designated the United States of America, and which International Application was published under PCT Article 21 (2) as WO Publication No. 2014/208932 A1, and which claims priority from and the benefit of Korean Application No. 10-2013-0073772, filed on 26 Jun. 2013, the disclosures of which are incorporated herein by reference in their entirety.

BACKGROUND

1. Field

The presently disclosed embodiment relates to controlling of an overcurrent of a grid-connected inverter, and a technology for preventing overcurrent of a grid-connected inverter when an abnormal grid voltage occurs.

2. Brief Description of Related Developments

In general, a grid-connected inverter generates power in synchronization with an output current reference value. However, if an instant low voltage occurs in a grid, a difference generates between an output voltage of the grid-connected inverter and a grid voltage, and accordingly, an input current of the grid-connected inverter varies rapidly. Due to the above rapid variation in the current, an overcurrent trip occurs in the grid-connected inverter.

SUMMARY

The presently disclosed embodiment provides an apparatus and method of controlling overcurrent of a grid-connected inverter due to an abnormal grid voltage, which is capable of reducing an output current before an output current rapidly varies, by detecting a rapid variation in a grid voltage.

According to an aspect of the presently disclosed embodiment, there is provided an apparatus of controlling overcurrent of a grid-connected inverter due to an abnormal grid voltage, the apparatus including: a grid voltage sensor configured to sense a grid voltage according to an output current of the grid-connected inverter; a voltage variation calculator configured to calculate a D-axis voltage and a Q-axis voltage of the grid voltage to obtain variation values of the D-axis voltage and the Q-axis voltage; and an output current controller configured to determine whether at least one of the D-axis voltage variation value and the Q-axis voltage variation value exceeds a set value of the grid voltage variation, and decrease the output current by a predetermined value when one of the D-axis voltage variation value and the Q-axis voltage variation value exceeds the set value of the grid voltage variation.

The output current controller may determine whether a greater value between the D-axis voltage variation value and the Q-axis voltage variation value exceeds the set value of the grid voltage variation.

The apparatus may further include a timer configured to count a predetermined time period after decreasing the output current by the predetermined value, wherein the output current controller may determine whether the predetermined time period has passed, and return the output current that has decreased to the output current of an original magnitude.

According to an aspect of the presently disclosed embodiment, there is provided a method of controlling overcurrent of a grid-connected inverter due to an abnormal grid voltage, the method including: sensing a grid voltage by a grid voltage sensor according to an output current of the grid-connected inverter; calculating a D-axis voltage variation value and a Q-axis voltage variation value by calculating a D-axis voltage and a Q-axis voltage by a voltage variation calculator; determining whether at least one of the D-axis voltage variation value and the Q-axis voltage variation value exceeds a set value of the grid voltage variation by using an output current controller; and when one of the D-axis voltage variation value and the Q-axis voltage variation value exceeds the set value of the grid voltage variation, decreasing the output current by a predetermined value by using the output current controller.

The determining of whether at least one of the D-axis voltage variation value and the Q-axis voltage variation value exceeds the set value of the grid voltage variation may determine whether a greater value between the D-axis voltage variation value and the Q-axis voltage variation value exceeds the set value of the grid voltage variation by using the output current controller.

The method may further include determining whether a predetermined time period has passed after decreasing the output current by the predetermined value by using a timer; and when the predetermined time period has passed, returning the output current that has decreased to the output current of an original magnitude by using the output current controller.

According to the presently disclosed embodiment, an output current of a grid-connected inverter is reduced by detecting a rapid variation in a grid voltage, thereby preventing trips of the grid-connected inverter due to overcurrent.

DETAILED DESCRIPTION

Hereinafter, an apparatus for controlling overcurrent of a grid-connected inverter due to abnormal grid voltage according to an aspect of the presently disclosed embodiment will be described in detail with reference to accompanying drawings.

Figure 1:
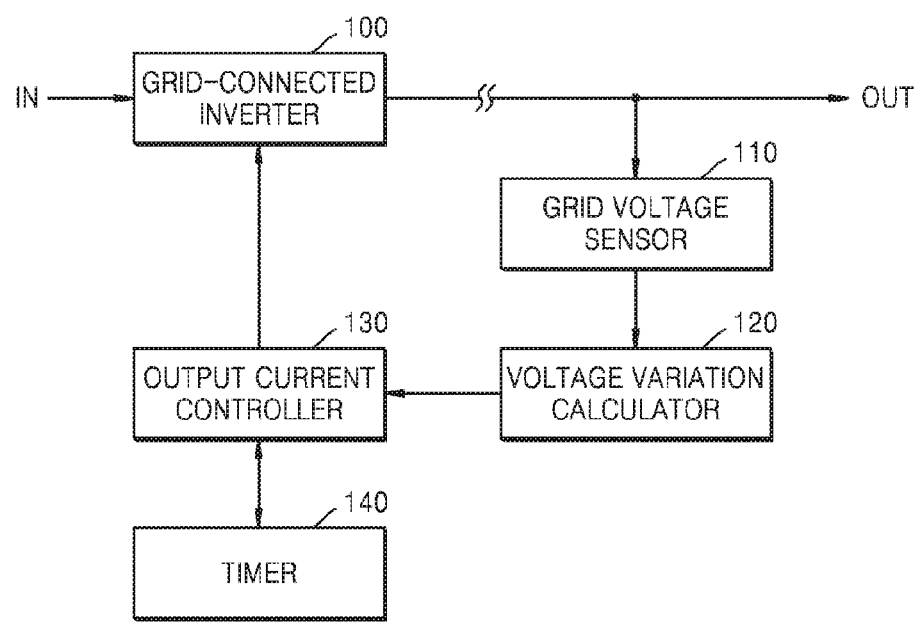
FIG. 1 is a block diagram of an apparatus for controlling overcurrent of a grid-connected inverter due to abnormal grid voltage according to an aspect of the presently disclosed embodiment.

FIG. 1 is a block diagram of an apparatus for controlling overcurrent of a grid-connected inverter due to abnormal grid voltage, according to an aspect of the presently disclosed embodiment. The apparatus includes a grid-connected inverter 100, a grid voltage sensor 110, a voltage variation value calculator 120, an output current controller 130, and a timer 140.

The grid-connected inverter 100 is an inverter connected to a power grid in order to supply electric power to a grid. A direct current (DC) electric power input via an input terminal IN is converted to an alternating current (AC) electric power in the grid-connected inverter 100, and is supplied to the power grid via an output terminal OUT.

The grid voltage sensor 110 senses a grid voltage output through the power grid, and outputs a sensing result to the voltage variation value calculator 120. The grid voltage sensor 110 includes a voltage measuring sensor for sensing the grid voltage.

The voltage variation value calculator 120 calculates a D-axis voltage and a Q-axis voltage of the grid voltage sensed by the grid voltage sensor 110 to produce variation values of the D-axis voltage and the Q-axis voltage, and outputs the calculation results to the output current controller 130. The voltage variation value calculator 120 calculates the D-axis voltage and the Q-axis voltage of the grid voltage that is sensed, and calculates a D-axis voltage variation value and a Q-axis variation value per a predetermined sampling time with respect to the calculated D-axis voltage and the Q-axis voltage. The D-axis voltage and the Q-axis voltage are obtained by transforming the grid voltages U, V, and W into a synchronous frame by a frequency of the grid voltage. In general, the Q-axis voltage is a magnitude of the grid voltage and the D-axis voltage is 0. For example, a three-phase grid voltage of 380 V is transformed into the synchronous frame, and then, the Q-axis voltage is 380 V and the D-axis voltage is 0 V.

The output current controller 130 determines whether at least one of the D-axis voltage variation value and the Q-axis voltage variation value calculated by the voltage variation value calculator 120 exceeds a set value of the grid voltage variation. The set value of the grid voltage variation denotes a threshold voltage value of a normal variation range for determining abnormality of the grid voltage at every predetermined period (for example, 250 μsec).

In particular, the output current controller 130 determines whether a large one between the D-axis voltage variation value and the Q-axis voltage variation value exceeds the set value of the grid voltage variation.

If one of the D-axis voltage variation value and the Q-axis voltage variation value exceeds the set value of the grid voltage variation, the output current controller 130 controls the grid-connected inverter 100 so as to reduce the output current output from the grid-connected inverter 100 by a predetermined value.

Figure 2:
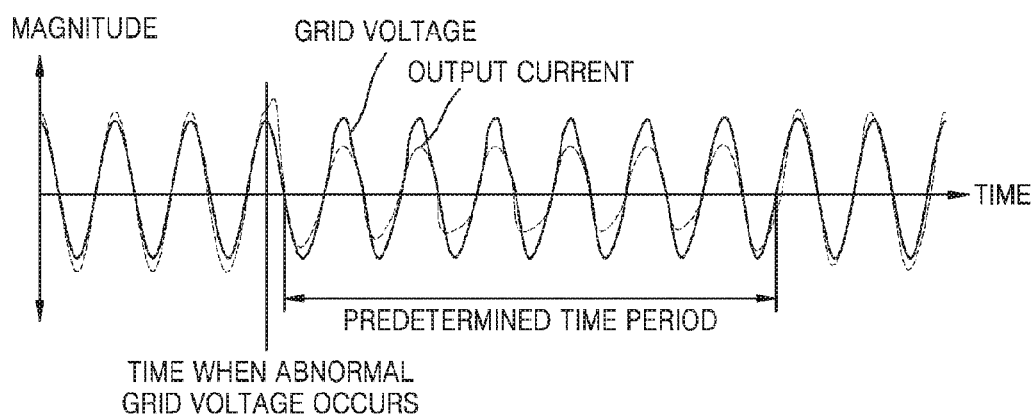
FIG. 2 is a graph showing a reduction in an output current according to the apparatus for controlling overcurrent of the grid-connected inverter of FIG. 1.

FIG. 2 is a graph showing a reduction in the output current by the apparatus for controlling overcurrent of the grid-connected inverter shown in FIG. 1.

As shown in FIG. 2, while the grid voltage is normally output from the power grid, abnormal value occurs in the D-axis voltage variation value or the Q-axis voltage variation value of the grid voltage, and then, the output current instantly increase after the time point when the abnormal grid voltage variation value occurs. Accordingly, if there is an abnormal D-axis voltage variation value or an abnormal Q-axis voltage variation value of the grid voltage, the output current controller 130 controls the grid-connected inverter 100 so as to reduce the magnitude of the output current, which has been suddenly increased, to a predetermined value or less. Accordingly, the grid-connected inverter 100 outputs the output current that has reduced to a predetermined value or less.

In addition, the output current controller 130 controls the timer 140 to start the timing operation when the output current decreases to a predetermined value or less.

The timer 140 counts a time period according to the timing start command of the output current controller 130. After that, the output current controller 130 determines whether the time period counted by the timer 140 has passed a predetermined time (e.g., 100 ms). Here, the predetermined time denotes a sufficient time to address the abnormal grid voltage.

If the predetermined time counted by the timer 140 has passed, the output current controller 130 controls the grid-connected inverter 100 to output the output current of an original magnitude from the output current. Accordingly, the grid-connected inverter 100 outputs the output current of the original magnitude.

Hereinafter, a method of controlling overcurrent of the grid-connected inverter due to the abnormal grid voltage, according to one or more aspects of the presently disclosed embodiment.

Figure 3:
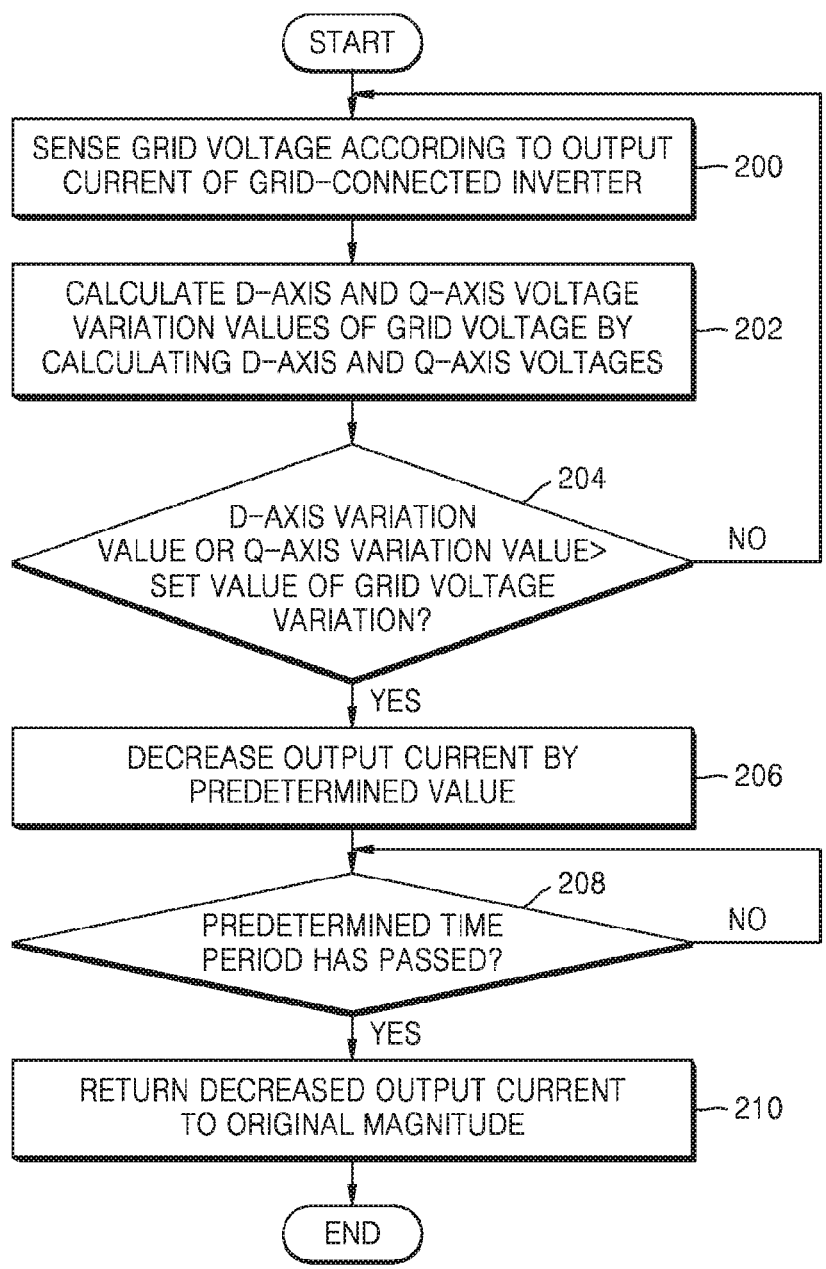
FIG. 3 is a flowchart illustrating a method of controlling overcurrent of a grid-connected inverter due to abnormal grid voltage according to an aspect of the presently disclosed embodiment.

FIG. 3 is a flowchart illustrating a method of controlling overcurrent of the grid-connected inverter due to the abnormal grid voltage, according to an aspect of the presently disclosed embodiment.

The grid voltage sensor 110 senses a grid voltage according to the output voltage from the grid-connected inverter 100 (S200).

After operation S200, the voltage variation calculator 120 calculates a D-axis voltage and Q-axis voltage of the grid voltage sensed by the grid voltage sensor 110, and calculates variation values of the D-axis current and the Q-axis current (S202). The voltage variation calculator 120 calculates the variation value of the D-axis voltage and the variation value of the Q-axis voltage per unit sampling time period with respect to the D-axis and Q-axis voltages of the grid voltage.

After operation S202, the output current controller 130 determined whether at least one of the D-axis voltage variation value and the Q-axis voltage variation value calculated by the voltage variation calculator 120 exceeds a set value of the grid voltage variation (S204). The set value of the grid voltage variation denotes a threshold voltage value of a normal variation range for determining abnormality of the grid voltage at a predetermined period (e.g., 250 μm). In particular, the output current controller 130 exceeds whether a greater value between the D-axis voltage variation value and the Q-axis voltage variation value exceeds the set value of the grid voltage variation.

After operation S204, the output current controller 130 decreases the output current output from the grid-connected inverter 100 by a predetermined value, when one of the D-axis and Q-axis variation values exceeds the set value of the grid voltage variation (S206). As shown in FIG. 2, when the grid voltage is normally output from the power grid and then there is abnormality in the D-axis voltage variation value or the Q-axis voltage variation value, the output current suddenly increases after the abnormality occurs in the grid voltage variation value. Therefore, the output current controller 130 controls the grid-connected inverter 100 to decrease to a predetermined value or less, and accordingly, the grid-connected inverter 100 outputs the output current that has decreased to the predetermined value or less.

After operation S206, the output current controller 130 determines whether a predetermined time period has passed after decreasing the output current by the predetermined value (S208). Here, the predetermined time period denotes a sufficient time for addressing the abnormality of the grid voltage.

After operation S208, when the predetermined time period has passed, the output current controller 130 returns the decreased output current to the output current of an original magnitude (S210). If the predetermined time period has passed, the output current controller 130 controls the grid-connected inverter 100 to output the output current of the original magnitude from the decreased output current, and accordingly, the grid-connected inverter 100 outputs the output current of the original magnitude.

The method according to one or more aspects of the presently disclosed embodiment can also be implemented through computer readable code/instructions in/on a medium, e.g., a computer readable medium, to control at least one processing element to implement any above described aspect. For example, the method may be implemented in a universal digital computer operating the codes/instructions/programs by using a computer readable recording medium. Examples of the computer-readable recording medium are magnetic storage media (e.g., ROM, floppy disks, hard disks, magnetic tapes, etc.) and optical recording media (e.g., CD-ROMs, or DVDs).

While this disclosure has been particularly shown and described with reference to aspects of the presently disclosed embodiment thereof, it will be understood by those of ordinary skill in the art that various changes in form and details may be made therein without departing from the spirit and scope of the following claims. The aspects of the presently disclosed embodiment should be considered in a descriptive sense only and not for purposes of limitation. Therefore, the scope of the disclosure is defined not by the detailed description of the disclosure but by the appended claims, and all differences within the scope will be construed as being included in the disclosure.

What is claimed is:

1. An apparatus of controlling overcurrent of a grid-connected inverter due to an abnormal grid voltage, the apparatus comprising:
   a grid voltage sensor configured to sense a grid voltage according to an output current of the grid-connected inverter;
   a voltage variation calculator configured to calculate a D-axis voltage and a Q-axis voltage of the grid voltage to obtain variation values of the D-axis voltage and the Q-axis voltage;
   an output current controller configured to determine whether at least one of the D-axis voltage variation value and the Q-axis voltage variation value exceeds a set value of the grid voltage variation, and decrease the output current by a predetermined value when one of the D-axis voltage variation value and the Q-axis voltage variation value exceeds the set value of the grid voltage variation; and
   a timer configured to count a predetermined time period after decreasing the output current by the predetermined value,
      wherein the output current controller determines whether the predetermined time period has passed, and returns the output current that has decreased to the output current of an original magnitude.

2. The apparatus of claim 1, wherein the output current controller determines whether a greater value between the D-axis voltage variation value and the Q-axis voltage variation value exceeds the set value of the grid voltage variation.

3. A method of controlling overcurrent of a grid-connected inverter due to an abnormal grid voltage, the method comprising:
   sensing a grid voltage by a grid voltage sensor according to an output current of the grid-connected inverter;
   calculating a D-axis voltage variation value and a Q-axis voltage variation value by calculating a D-axis voltage and a Q-axis voltage by a voltage variation calculator;
   determining whether at least one of the D-axis voltage variation value and the Q-axis voltage variation value exceeds a set value of the grid voltage variation by using an output current controller;
   when one of the D-axis voltage variation value and the Q-axis voltage variation value exceeds the set value of the grid voltage variation, decreasing the output current by a predetermined value by using the output current controller;
   determining whether a predetermined time period has passed after decreasing the output current by the predetermined value by using a timer; and
   when the predetermined time period has passed, returning the output current that has decreased to the output current of an original magnitude by using the output current controller.

4. The method of claim 3, wherein the determining of whether at least one of the D-axis voltage variation value and the Q-axis voltage variation value exceeds the set value of the grid voltage variation determines whether a greater value between the D-axis voltage variation value and the Q-axis voltage variation value exceeds the set value of the grid voltage variation by using the output current controller.

* * * * *